United States Patent
Machani et al.

(10) Patent No.: US 10,516,527 B1
(45) Date of Patent: Dec. 24, 2019

(54) SPLIT-KEY BASED CRYPTOGRAPHY SYSTEM FOR DATA PROTECTION AND SYNCHRONIZATION ACROSS MULTIPLE COMPUTING DEVICES

(71) Applicant: EMC IP HOlding Company LLC, Hopkinton, MA (US)

(72) Inventors: Salah Machani, Toronto (CA); Boris Kronrod, Netanya (IL); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 14/869,150

(22) Filed: Sep. 29, 2015

Related U.S. Application Data (60) Provisional application No. 62/148,984, filed on Apr. 17, 2015.

(51) Int. Cl.
| | | |
|---|---|---|
| *H04L 9/08* | (2006.01) | |
| *H04L 9/06* | (2006.01) | |
| *H04L 9/14* | (2006.01) | |
| *H04L 9/30* | (2006.01) | |
| *H04L 29/06* | (2006.01) | |

(52) U.S. Cl.
CPC .......... *H04L 9/0822* (2013.01); *H04L 9/0625* (2013.01); *H04L 9/0869* (2013.01); *H04L 9/14* (2013.01); *H04L 9/30* (2013.01); *H04L 63/06* (2013.01)

(58) Field of Classification Search
CPC ..... H04L 9/0822; H04L 9/0869; H04L 63/06; H04L 9/14; H04L 9/30; H04L 9/0625
See application file for complete search history.

(56) References Cited

U.S. PATENT DOCUMENTS 6,466,552 B1 * 10/2002 Haumont .............. H04W 8/186 370/310
6,834,112 B1 * 12/2004 Brickell .................. G06F 21/31 380/279

(Continued)

OTHER PUBLICATIONS

U.S. Appl. No. 14/319,276, filed Jun. 30, 2014, entitled, System and Method for Key Material Protection on Devices Using a Secret Sharing Scheme.

(Continued)

*Primary Examiner* — Cheng-Feng Huang
(74) *Attorney, Agent, or Firm* — Ryan, Mason & Lewis, LLP (57) ABSTRACT

Split-key based cryptography techniques are provided for data protection and synchronization across multiple computing devices of a user. A method performed by a first device of a user comprises encrypting a data using a randomly-generated data encryption key; wrapping the data encryption key with a public key of a second device of the user; and sending the encrypted data and the wrapped data encryption key of the first device wrapped with the public key of the second device to a server. The server sends the encrypted data and the wrapped data encryption key of the first device wrapped with the public key of the second device to the second device. The first device or the second device can access the encrypted data by reconstructing their respective private key using a predefined number of shares obtained using a key splitting scheme.

20 Claims, 8 Drawing Sheets

(56) References Cited

U.S. PATENT DOCUMENTS

| | | | | |
|---|---|---|---|---|
| 9,641,520 | B2* | 5/2017 | Neuman | H04L 63/08 |
| 2002/0013898 | A1* | 1/2002 | Sudia | G06Q 20/02 |
| | | | | 713/155 |
| 2002/0071566 | A1* | 6/2002 | Kurn | H04L 63/062 |
| | | | | 380/281 |
| 2006/0036548 | A1* | 2/2006 | Roever | G06F 21/10 |
| | | | | 705/51 |
| 2006/0288232 | A1* | 12/2006 | Ho | G06F 21/6227 |
| | | | | 713/185 |
| 2008/0063197 | A1* | 3/2008 | Jaquette | H04L 9/0897 |
| | | | | 380/201 |
| 2011/0283113 | A1* | 11/2011 | Moffat | G06F 21/602 |
| | | | | 713/189 |
| 2012/0243687 | A1* | 9/2012 | Li | H04L 9/085 |
| | | | | 380/277 |
| 2013/0238903 | A1* | 9/2013 | Mizunuma | G06F 21/31 |
| | | | | 713/176 |
| 2013/0262857 | A1* | 10/2013 | Neuman | H04L 63/08 |
| | | | | 713/155 |
| 2014/0164776 | A1* | 6/2014 | Hook | H04L 9/14 |
| | | | | 713/171 |
| 2015/0262171 | A1* | 9/2015 | Langschaedel | G06Q 20/065 |
| | | | | 705/71 |
| 2015/0288514 | A1* | 10/2015 | Pahl | H04L 9/085 |
| | | | | 713/171 |

OTHER PUBLICATIONS

U.S. Appl. No. 14/577,206, filed Dec. 19, 2014, entitled, Protection of a Secret on a Mobile Device Using a Secret-Splitting Technique with a Fixed User Share.

* cited by examiner

FIG. 11

SPLIT-KEY BASED CRYPTOGRAPHY SYSTEM FOR DATA PROTECTION AND SYNCHRONIZATION ACROSS MULTIPLE COMPUTING DEVICES

CROSS-REFERENCE TO RELATED APPLICATIONS

The present application claims priority to U.S. Provisional Patent Application Ser. No. 62/148,984, filed Apr. 17, 2015, entitled "Split-Key Based Cryptographic Techniques for Data Protection, Recovery and Synchronization Across Multiple Computing and/or Computerized Devices;" and is related to U.S. patent application Ser. No. 14/319,276, filed Jun. 30, 2014, (now U.S. Pat. No. 9,461,821), entitled "System and Method for Key Material Protection on Devices Using a Secret Sharing Scheme;" and U.S. patent application Ser. No. 14/577,206, filed Dec. 19, 2014 (now U.S. Pat. No. 9,455,968), entitled "Protection of a Secret on a Mobile Device Using a Secret-Splitting Technique with a Fixed User Share," each incorporated by reference herein.

FIELD

The present invention relates to the protection of secret keys and other information in multiple computing devices.

BACKGROUND

Protecting sensitive data that is stored in mobile devices or accessed through mobile devices is a fundamental security problem. Users store, access, process and manage high volumes of personal or enterprise data through their mobile devices, and this data must be protected against leakage to unauthorized parties due to partial or full compromise of the device by an attacker. Secure data protection in mobile settings, however, entails certain challenges.

For better security, data should be hardened by the use of cryptographic tools (e.g., encryption for data confidentiality), wherein strong keys must be generated, used and managed for this purpose. However, these keys must themselves be protected, and key protection in mobile settings introduces more challenges. For better usability, however, access to data should be controlled in ways that require minimal user involvement and incur no usage distraction. If keys are associated with password-protected credentials, or if keys are replaced altogether by passwords, then security and usability are both negatively affected.

A number of solutions based on secret sharing schemes have been proposed to address some of the above challenges for secure data protection in mobile devices. For example, a number of solutions employ a cryptographically strong key for protecting sensitive data, wherein this key is split into two or more shares dispersed amongst a set of devices. Access to the data protected by such a split key requires reconstruction of the split key.

A need remains for improved security techniques for protecting and synchronizing sensitive data stored on multiple devices of the same user.

SUMMARY

Illustrative embodiments of the present invention provide split-key based cryptography techniques for data protection and synchronization across multiple computing devices of a user. In one embodiment, a method performed by a first device of a user comprises encrypting a data using a randomly-generated data encryption key; wrapping the data encryption key with a public key of a second device of the user; and sending the encrypted data and the wrapped data encryption key of the first device wrapped with the public key of the second device to a server, wherein the server sends the encrypted data and the wrapped data encryption key of the first device wrapped with the public key of the second device to the second device, wherein one or more of the first and second devices can access the encrypted data by reconstructing a private key of the one or more of the first and second devices using a predefined number of shares obtained using a key splitting scheme.

In one or more exemplary embodiments, the key splitting scheme splits one or more of the private key of the first device and a randomly-generated private key wrapping key into a plurality of shares comprising a user password key share, a device key share stored by the first device and a remote key share stored by the server. In an exemplary offline mode, reconstruction of the private key requires the user password key share and the device key share. In an exemplary online mode, reconstruction of the private key requires the device key share and the remote key share when the first device is in an online mode. The device key share is optionally only released if the user authenticates to the device using one or more predefined device unlock methods (such as biometric verification, entering a predefined device unlock passcode, and use of a predefined proximity device). The remote key share is optionally only released if the first device authenticates to the server using a transport private key of the first device.

In at least one embodiment, the first device further comprises a recovery private key and wherein the key splitting scheme splits one or more of the recovery private key of the first device and a randomly-generated private key wrapping key into a plurality of shares comprising a user password key share, a remote key share stored by the server and an emergency key share. The recovery private key is reconstructed, for example, by combining the remote key share with one of the user password key share and the emergency key share.

Embodiments of the invention can be implemented in a wide variety of different devices for the protection and synchronization of key material or other protected material across multiple computing devices of a user.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide split-key based cryptography techniques for data protection and synchronization across multiple computing devices of a user. In one or more exemplary embodiments of the invention, split-key based cryptography techniques are employed for sensitive data protection, recovery and secure synchronization across multiple devices of a user. The user devices can include portable and/or non-portable computing devices, such as smartphones, tablets, desktop computers and/or laptop computers. In this manner, users can synchronize protected content across all or a subset of their devices.

Figure 1:
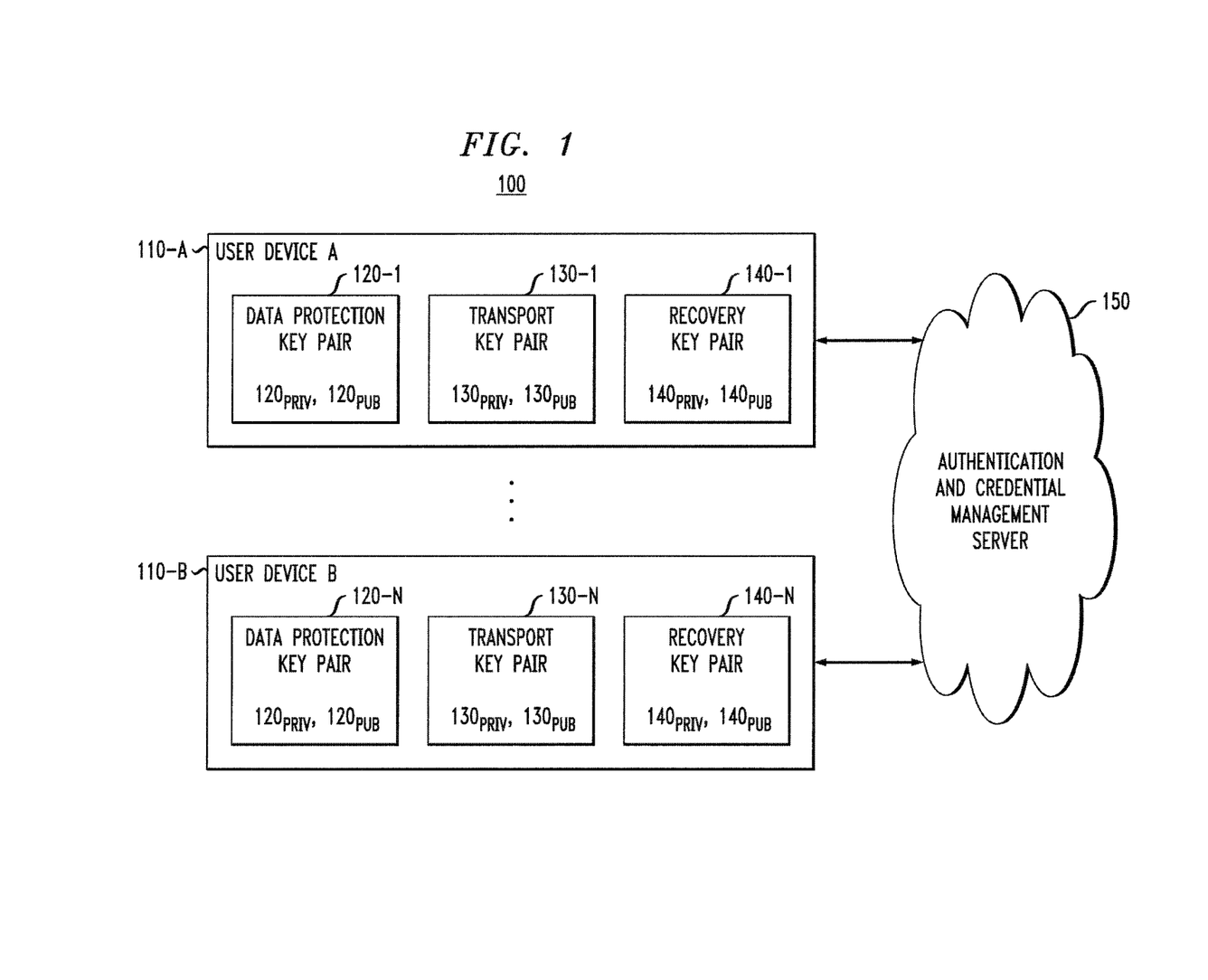
FIG. 1 illustrates an exemplary network environment in which the present invention may be employed.

FIG. 1 illustrates an exemplary network environment 100 in which the present invention may be employed. As shown in FIG. 1, two exemplary user devices 110-A and 110-B of a given user, such as mobile phones and/or tablets, are connected over a network (not shown) to an authentication and credential management server 150, for example, on the cloud. As noted above, aspects of the present invention allow a given user to protect, synchronize and recover one or more secrets across multiple devices 110-A and 110-B of the given user.

In at least one exemplary embodiment, shown in FIG. 1, each user device 110 has (i) at least one data protection asymmetric key pair 120 (one per data owner, such as for personal and business use of the same user) comprised of a data protection private key $120_{priv}$ and a data protection public key $120_{pub}$ for encrypting user data; and (ii) one transport asymmetric key pair 130 comprised of a transport private key $130_{priv}$ and a transport public key $130_{pub}$ for protecting communications between device clients and the cloud server 150. In addition, each user optionally has at least one data recovery asymmetric key pair 140 (one per data owner) comprised of a recovery private key $140_{priv}$ and a recovery public key $140_{pub}$.

The client on a given device 110 sends the data protection public key $120_{pub}$ of the given device 110 to the authentication and credential management server 150 signed with the associated data protection private key $120_{priv}$.

The recovery keys 140 can be used across multiple devices of the same user. The user may have multiple recovery key pairs 140, such as one for personal content/credentials and one or more for the recovery of business/enterprise credentials. The recovery key pair 140 is used if the user loses all of his or her registered devices 110 in order to restore protected content to one or more devices 110.

Key-Splitting

Figure 2:
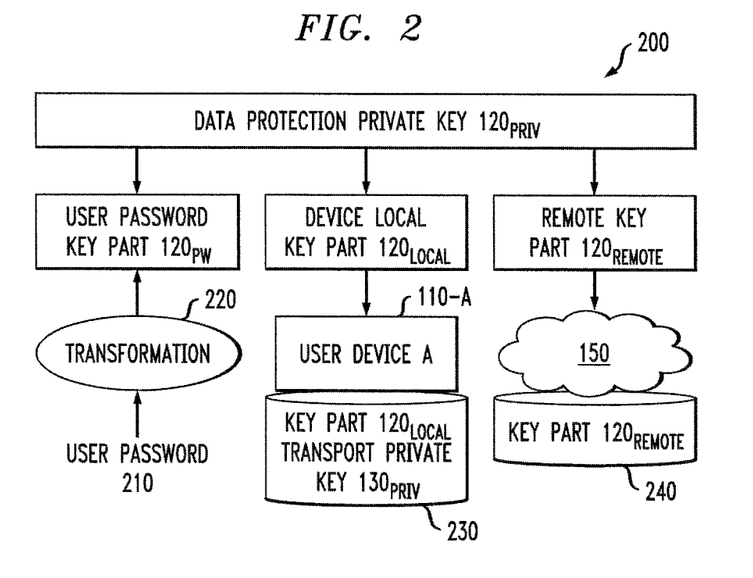
FIG. 2 illustrates an exemplary key splitting process for splitting the data protection private keys of FIG. 1.

FIG. 2 illustrates an exemplary key splitting process 200 for splitting the data protection private key $120_{priv}$ (or another unique private-key wrapping key) of a given device 110 into at least three parts: a user password-key part $120_{PW}$, a device local-key part $120_{LOCAL}$, and a remote-key part $120_{REMOTE}$. The client deletes the data protection private key $120_{priv}$ from memory following the key splitting 200.

Key-splitting techniques, such as the exemplary key splitting process 200, split a cryptographically strong key for protecting sensitive data into two or more shares dispersed among a set of devices (e.g., mobile devices, smart objects and online servers). Then, access to data protected by such a split key requires reconstruction of the split key, as discussed further below in conjunction with FIG. 7. The split key can be reconstructed by requesting, collecting and cryptographically combining an appropriate subset of such key. Share collection may be further controlled by other user/device authentication and authorization mechanisms (e.g., by using a password to get access to a stored secret share, or as a secret share itself, or by requiring explicit or implicit user authentication before being able to download a share from an online server). If Shamir's (t, n)-threshold secret sharing scheme is used for splitting the key into n shares, a combination of any t, or more, such shares is necessary to reconstruct the key. See, for example, Adi Shamir, "How to Share a Secret," Communications of the ACM, Vol. 22, No. 11, 612-13, (1979), incorporated by reference herein.

U.S. patent application Ser. No. 14/319,276, filed Jun. 30, 2014 (now U.S. Pat. No. 9,461,821), entitled "System and Method for Key Material Protection on Devices Using a Secret Sharing Scheme," discloses a technique based on a "wrapping of shares" for enabling flexible reconstruction policies of keys split using a threshold sharing scheme (e.g., Shamir's scheme) that are more general than just threshold conditions of the form "t out of n".

U.S. patent application Ser. No. 14/577,206, filed Dec. 19, 2014 (now U.S. Pat. No. 9,455,968), entitled "Protection of a Secret on a Mobile Device Using a Secret-Splitting Technique with a Fixed User Share," discloses a technique based on "fixed shares" for enabling flexible reconstruction policies of keys split using Shamir's sharing scheme that allow for the use of one or more user-defined shares (e.g., a password) during key reconstruction.

Collectively, the above solutions allow for protecting mobile data as follows. Data is encrypted using a strong secret key, which may be split into sufficiently many shares, including at least one password share. Then, security is advanced by distributing shares to the appropriate entities and achieving better intrusion resilience, and usability is advanced by allowing flexible reconstruction policies that may be user-transparent depending on the operational context.

The exemplary password-based key splitting process 200 employs a (2, 3) threshold scheme. If a (2, 3) threshold scheme is employed with one password share (derived by a password remembered by the user), one device share (stored at the device) and one server share (stored at an online server), then security is hardened because an attacker needs to compromise both the device and the server, or one of the two and guess the user's password, in order to gain unauthorized access to the user's data. Also, usability is improved by allowing user-agnostic data access, through reconstruction of the key, performed at the device, using the device and server shares, when the device is online (i.e., has network connectivity with the online server), while still allowing undisrupted data access in cases the device is offline (e.g., while operating in "airplane" mode), through reconstruction, performed at the device, using the password and the device shares.

As shown in FIG. 2, the user password-key part $120_{PW}$ is derived from a user password 210 or another stable input data using a transformation 220. The user password-key part $120_{PW}$ is not stored. For example, input stable data may include, but is not limited to, biometric data, other user portable and wearable device identifiers in proximity, beacons or other connected devices in proximity of a user. For a more detailed discussion of the generation of user password-key parts, see, for example, U.S. patent application Ser. No. 14/577,206, filed Dec. 19, 2014 (now U.S. Pat. No. 9,455,968), entitled "Protection of a Secret on a Mobile Device Using a Secret-Splitting Technique with a Fixed User Share;" and U.S. patent application Ser. No. 14/672,507, filed Mar. 30, 2015 (now U.S. Pat. No. 9,813,243), entitled "Methods and Apparatus for Password-Based Secret Sharing Scheme," each incorporated by reference herein.

The local-key part $120_{LOCAL}$ of a device, such as device 110-A are stored in a local device keystore 230 of the device. Access to records in the local keystore 230 can be protected using one or more device unlock authentication methods (such as a valid fingerprint or passcode), as discussed further below in conjunction with FIG. 8, or other user verification methods, before they can be released from the key store and used.

The remote-key part $120_{REMOTE}$ is sent to the authentication and credential management server 150 and stored in a key store 240. In one or more exemplary embodiments, the transport private key $130_{priv}$ of a given device 110 is used to sign client requests to obtain the remote-key part $120_{REMOTE}$. The transport private key $130_{priv}$ of a given device is optionally also stored in the local device keystore 230.

The client uses the data protection private key $120_{priv}$ to decrypt any content enveloped under the associated data protection public key $120_{pub}$, as discussed further below in conjunction with FIG. 7. The client must first reconstruct the private key $120_{priv}$ by combining at least two of the total number of key shares user password-key part $120_{PW}$, device local-key part $120_{LOCAL}$, and remote-key part $120_{REMOTE}$. Online and offline methods for reconstructing the data protection private key $120_{priv}$ are discussed further below in conjunction with FIG. 8.

Generally, when the device is in an offline mode (e.g., when the device data network on the device 110 is either disabled by the user or when there is no data network coverage), only protected content that is stored locally on the device 110 is accessible to the user. In at least one exemplary embodiment, the password-key part $120_{PW}$ and the device local-key part $120_{LOCAL}$ can be combined to reconstruct the data protection private key $120_{priv}$ of the device 110 when the device 110 is in an offline mode.

In addition, when the device is in an online mode, protected content that is stored locally on the device 110 and/or remotely on the authentication and credential management server 150 in the cloud is accessible to the user. The device local-key part $120_{LOCAL}$ and the remote-key part $120_{REMOTE}$ can be combined to reconstruct the data protection private key $120_{priv}$ of the device 110 when the device 110 is in an online mode.

A recovery mode is optionally provided, to restore access to protected content, for example, when a user loses all registered devices 110.

Figure 3:
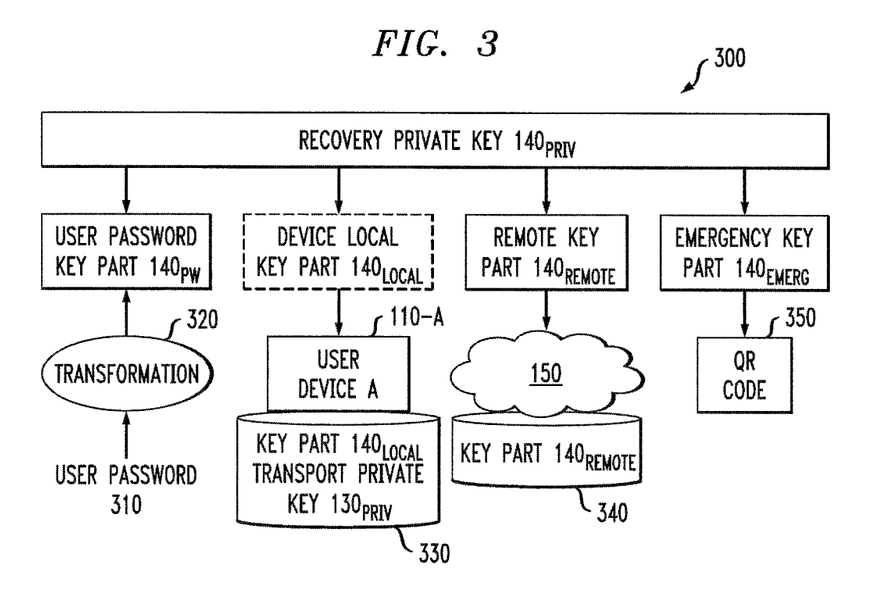
FIG. 3 illustrates an exemplary key splitting process for splitting the recovery private keys of FIG. 1.

FIG. 3 illustrates an exemplary key splitting process 300 for splitting the recovery private key $140_{priv}$ of a given user into at least four parts. As shown in FIG. 3, the data recovery private key $140_{priv}$ (or another unique private-key wrapping key) of a given user is split into three or more key parts: a user password-key part $140_{PW}$, a device local-key part $140_{LOCAL}$ (optional), a remote-key part $140_{REMOTE}$, and an emergency-key part $140_{EMERG}$. The device local-key part $140_{LOCAL}$ is optional because recovery is normally required when the user loses a device and wants to restore the secret data to a new device.

The user password-key part $140_{PW}$, optional device local-key part $140_{LOCAL}$, and remote-key part $140_{REMOTE}$, are computed and stored in a similar manner as the key splitting process 200 of FIG. 2. For the emergency-key part $140_{EMERG}$, the user can choose to print the emergency-key part $140_{EMERG}$ as a QR (Quick Response) code 350, store the emergency-key part $140_{EMERG}$ in a wearable device, hide the emergency-key part $140_{EMERG}$ in a picture, or send the emergency-key part $140_{EMERG}$ to social friends and family members. The client deletes the recovery private key $140_{priv}$ from memory following the key splitting 300, in a similar manner as FIG. 2.

To reconstruct the recovery private key $140_{priv}$, the user will need to combine two of the four keys: user password-key part $140_{PW}$, optional device local-key part $140_{LOCAL}$, remote-key part $140_{REMOTE}$, and emergency-key part $140_{EMERG}$.

Policies can optionally be established to define rules for the two keys that can be combined to reconstruct the recovery private key $140_{priv}$. For example, the user may have to combine the password-derived key part $140_{PW}$ with the device's key part $140_{LOCAL}$ (if available), the optional device key part $140_{LOCAL}$, with the cloud key part $140_{REMOTE}$, the password-derive key part $140_{PW}$ with the cloud key part $140_{REMOTE}$, or the emergency key part $140_{EMERG}$ with the cloud key-part $140_{REMOTE}$.

For example, a policy may specify that the remote key part (cloud key part $140_{REMOTE}$) is combined with the user password key part $140_{PW}$ when the password is known by the user during the recovery process. Otherwise, the remote key part $140_{REMOTE}$ is combined with the emergency key part $140_{EMERG}$ when the user password is not known. The remote key part $140_{REMOTE}$ is only released after verifying the identity of the user using one of more predefined methods including registered email confirmation, knowledge base authentication and biometrics such as voice recognition. To further improve the access control mechanism and the security of the recovery process, implementations may force the user to provide a valid emergency key part $140_{EMERG}$ first before requesting the remote key part $140_{REMOTE}$ from the server. This will deter any attacker from attempting to fetch the remote key part $140_{REMOTE}$ from the server if they do not have access to a valid emergency key part $140_{EMERG}$ even when they are able to bypass any of the enforced user identity verifications discussed above (e.g., registered email confirmation, knowledge base authentication and biometric verification such as voice recognition).

In addition, different access control mechanisms can optionally be enforced before any of the data encryption key parts 120 or the data recovery key parts 140 can be released and used. To further improve the security of the data and user interactions with the system, strong device identification and risk-based authentication are optionally introduced.

Registration of Devices

Figure 4:
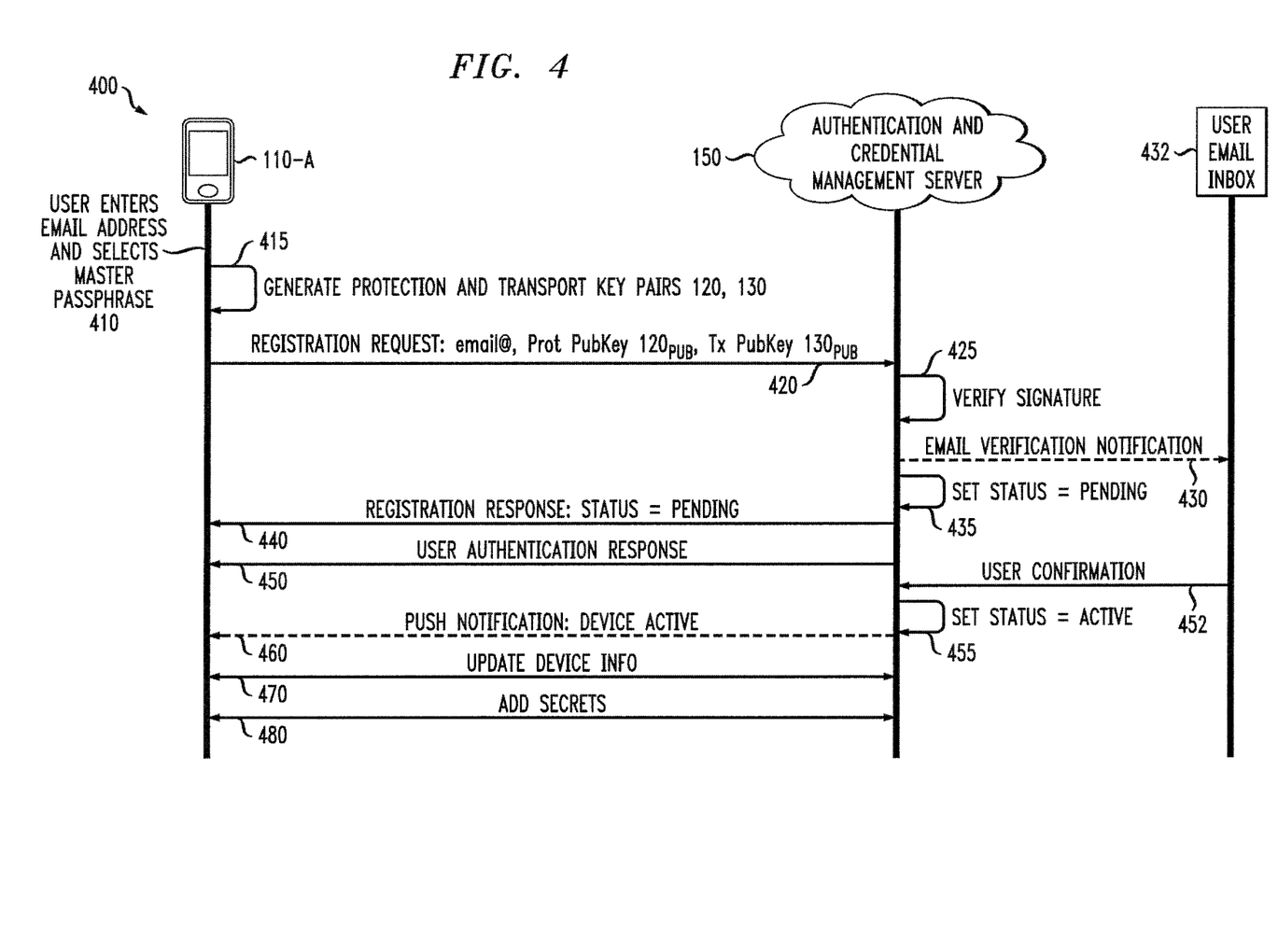
FIG. 4 illustrates a communication sequence for creating an account and registering a first device of a given user.

FIG. 4 illustrates a communication sequence 400 for creating an account and registering a first device 110 of a given user. As shown in FIG. 4, a user employs an exemplary device 110-A to enter an email address and select a master passphrase during step 410 to create a new account. In the exemplary embodiment, the email address is used to link the various devices 110 of a given user. The passphrase may have to satisfy predefined rules, such as requiring at least one space character, a mix of any uppercase and lowercase letters and numbers from the ASCII printable characters set.

During step 415, the exemplary device 110-A generates data protection and transport key pairs 120, 130. The exemplary device 110-A then sends a registration request during step 420 comprising the user's email address, data protection public key $120_{pub}$ and transport public key $130_{pub}$ to the authentication and credential management server 150. The authentication and credential management server 150 then verifies the signature during step 425.

During step 430, the authentication and credential management server 150 emails a verification notification to the inbox 432 of the user email account specified in the registration. The authentication and credential management server 150 sets the status of the user account to pending during step 435.

The authentication and credential management server 150 sends a registration response during step 440 comprising a status of pending to the device 110-A. The authentication and credential management server 150 sends a user authentication response to the device 110-A during step 450.

The user sends a user confirmation email from email account 432 during step 452 to the authentication and credential management server 150. The authentication and credential management server 150 sends a push notification message to the device 110-A during step 460 indicating that device 110-A is active.

The authentication and credential management server 150 and device 110-A communicate during step 470 to update the device information for device 110-A. The authentication and credential management server 150 and device 110-A communicate during step 480 to add secrets to the device 110-A.

Figure 5:
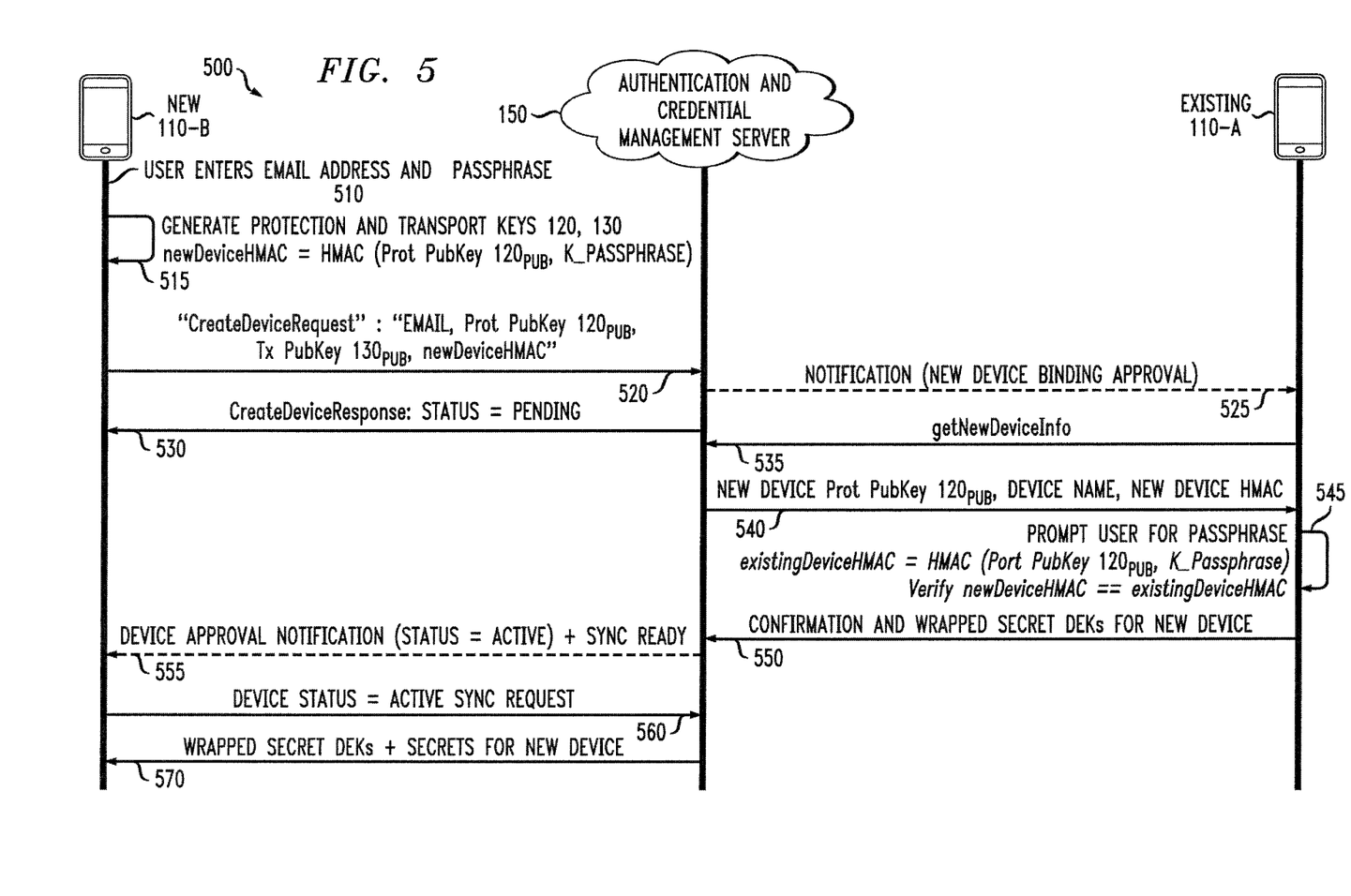
FIG. 5 illustrates a communication sequence for registering an additional device of the given user of FIG. 4.

FIG. 5 illustrates a communication sequence 500 for registering an additional device 110 of the given user of FIG. 4. As shown in FIG. 4, a user employs exemplary new device 110-B to enter an email address and master passphrase during step 510 to add a new device 110-B to an existing account (set up for device 110-A). As noted above, in the exemplary embodiment, the email address is used to link the various devices 110 of a given user.

During step 515, the device 110-B generates protection and transport keys 120, 130 and sets a value newDeviceHMAC equal to HMAC (data protection public key $120_{pub}$, K_Passphrase), where HMAC indicates a Hash-based message authentication code. The device 110-B sends a create device request message during step 520 to the authentication and credential management server 150 with the user's email address, data protection public key $120_{pub}$, transport public key $130_{pub}$, and the newDeviceHMAC value.

During step 525, the authentication and credential management server 150 sends a notification (new device binding approval) to the existing device 110-B. The authentication and credential management server 150 responds during step 530 with a create device response message having a status equal to pending.

The device 110-A sends a get new device information request to the authentication and credential management server 150 during step 535. The authentication and credential management server 150 responds during step 540 with the data protection public key $120_{pub}$, device name and new device HMAC of the new device 110-B to the existing device 110-A.

During step 545, the existing device 110-A prompts the user for the passphrase, sets a value existingDeviceHMAC equal to the HMAC of the data protection public key $120_{pub}$ and the passphrase and verifies that the newDeviceHMAC value equals the existingDeviceHMAC value.

The existing device 110-A then sends a confirmation and wrapped secret DEKs (Data Encryption Keys) for the new device 110-B to the authentication and credential management server 150 during step 550.

The authentication and credential management server 150 sends a device approval notification indicating an active status during step 555 with a synchronization ready message to the new device 110-B. The new device 110-B sends an active device status message and a synchronization request message to the authentication and credential management server 150 during step 560.

The authentication and credential management server 150 sends the wrapped secret DEKs and secrets for the new device 110-B to the new device 110-B during step 570.

Device Authentication and Risk Assessment

Figure 6:
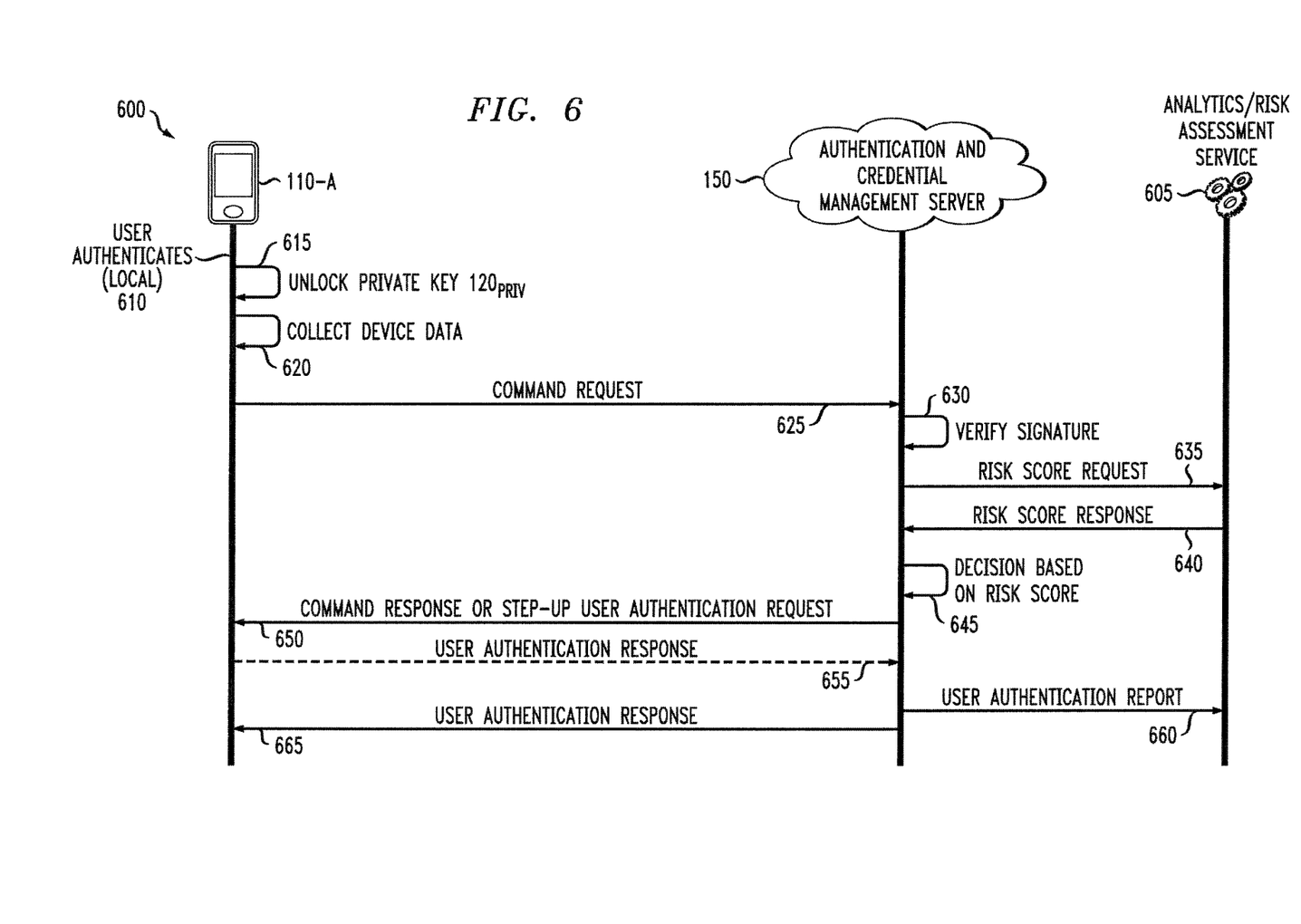
FIG. 6 illustrates a communication sequence for performing device authentication and risk assessment in accordance with at least one embodiment of the invention.

FIG. 6 illustrates a communication sequence 600 for performing device authentication and risk assessment in accordance with at least one embodiment of the invention. As shown in FIG. 6, a user employs exemplary device 110-A to authenticate the user to the device 110-A during step 610 using one or more device unlock authentication methods (such as a valid fingerprint or passcode), as discussed further below in conjunction with FIG. 8.

The device 110-A then unlocks private key $120_{priv}$ during step 615 and collects device data during step 620. The device 110-A sends a command request to the authentication and credential management server 150 during step 625.

The authentication and credential management server 150 verifies the signature from device 110-A during step 630 and sends a risk score request to an analytics/risk assessment service 605 during step 635. The analytics/risk assessment service 605 may be implemented, for example, as the RSA Risk Engine™ (produced by RSA, The Security Division of EMC, based in Hopkinton, Mass.) that performs Adaptive Authentication™ using a risk model based on characteristics of the user, user device and/or transaction information. The analytics/risk assessment service 605 provides a risk score response to the authentication and credential management server 150 during step 640.

The authentication and credential management server 150 makes a decision based on the risk score during step 645 and sends either a command response or a Step-up user authentication request to device 110-A during step 650.

The device 110-A sends a user authentication response to the authentication and credential management server 150 during step 655. The authentication and credential management server 150 sends a user authentication report to the analytics/risk assessment service 605 during step 660 and sends a user authentication response to the device 110-A during step 665.

Secret Sharing

Figure 7:
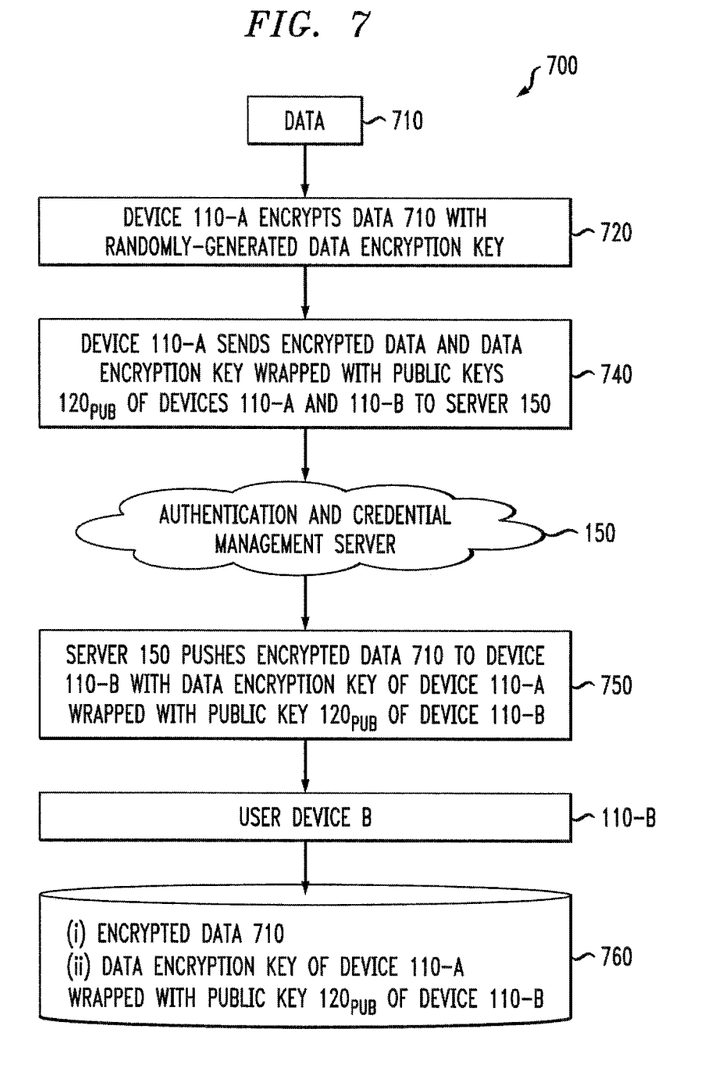
FIG. 7 illustrates a secret sharing process whereby a given user can share a secret among a plurality of registered devices of the given user.

FIG. 7 illustrates a secret sharing process 700 whereby a given user can share data 710 among a plurality of devices 110-A and 110-B of the given user. The data 710 may comprise, for example, login credentials (e.g., username/password) for personal and business web based and native applications; authentication access tokens, for example, for federated applications; a personal identification number for an RSA SecurID™ token (produced by RSA, The Security Division of EMC, based in Hopkinton, Mass.) for two-factor authentication enabled applications; third party application secrets, such as cryptographic key material; and user private notes, e.g., free text notes that the user may want to store, access and share securely.

As shown in FIG. 7, the user device 110-A encrypts the data 710 during step 720 with a randomly-generated data encryption key and then wraps the data encryption key with the public keys $120_{pub}$ of devices 110-A and 110-B Device 110-A then sends the encrypted data 710 and the data encryption key wrapped with the public keys $120_{pub}$ of devices 110-A and 110-B to the authentication and credential management server 150 during step 740. The authentication and credential management server 150 then pushes the encrypted data 710 to device 110-B with the data encryption key of device 110-A wrapped with the public key $120_{pub}$ of device 110-B during step 750. Device 110-B then stores the received encrypted data 710 and wrapped data encryption key of device 110-A wrapped with the public key $120_{pub}$ of device 110-B in a local data store 760.

To decrypt the data, the device 110-B unwraps the wrapped data encryption key of device 110-A using the private key $120_{priv}$ of device 110-B and then decrypts the encrypted data 710 using the unwrapped data encryption key.

In one exemplary variation, if the data 710 is smaller than a predefined threshold (e.g., typically less than the size of the asymmetric key 120 that is used to encrypt the data), then the secret sharing process 700 encrypts the data 710 directly using the asymmetric public key $120_{pub}$ of device 110-A during step 720. To decrypt the encrypted data, the device 110-B uses the associated asymmetric private key.

It is noted that the communications shown in FIG. 7 are optionally performed in accordance with one or more of Cryptographic Message Syntax (CMS); Public-Key Cryptography Standards (PKCS) #7 (used to sign and/or encrypt messages under a PKI); and Secure/Multipurpose Internet Mail Extensions (S/MIME).

Offline and Online Access Modes

As indicated above, one or more embodiments of the invention provides online and offline methods for reconstructing the data protection private key $120_{priv}$. Generally, when the device is in an offline mode (e.g., when the device data network on the device 110 is either disabled by the user or when there is no data network coverage), only protected content that is stored locally on the device 110 is accessible to the user. In at least one exemplary embodiment, the password-key part $120_{PW}$ and the device local-key part $120_{LOCAL}$ can be combined to reconstruct the data protection private key $120_{priv}$ of the device 110 when the device 110 is in an offline mode.

In addition, when the device is in an online mode, protected content that is stored locally on the device 110 and/or remotely on the authentication and credential management server 150 in the cloud is accessible to the user. The device local-key part $120_{LOCAL}$ and the remote-key part $120_{REMOTE}$ can be combined to reconstruct the data protection private key $120_{priv}$ of the device 110 when the device 110 is in an online mode. The authentication and credential management server 150 will not release the remote-key part $120_{REMOTE}$ to the device unless the user device 110 authenticates to the authentication and credential management server 150 using the associated transport private key $130_{priv}$.

Figure 8:
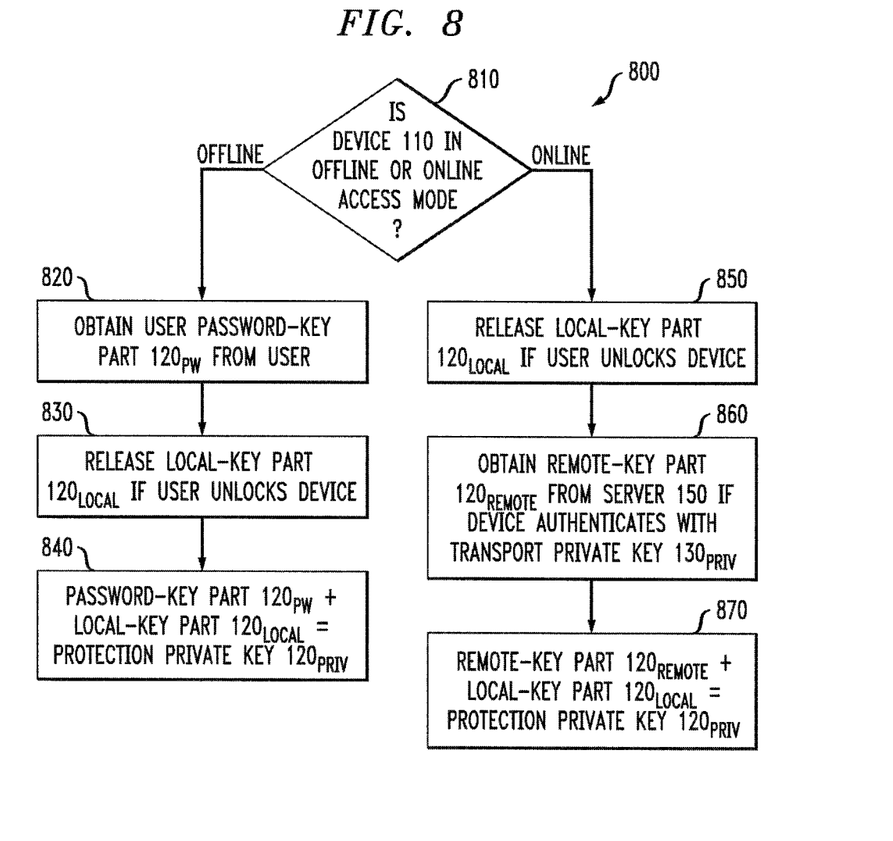
FIG. 8 illustrates an exemplary private key reconstruction process for implementing offline and online access modes.

FIG. 8 illustrates an exemplary private key reconstruction process 800 for implementing offline and online access modes. As shown in FIG. 8, a test is initially performed during step 810 to determine if the particular device 110 is in an offline or online access mode. If it is determined during step 810 that the device 110 is in an offline mode, then the device 110 obtains the user password-key part $120_{PW}$ from the user during step 820 and releases the local-key part $120_{LOCAL}$ during step 830 if the user unlocks the device 110. The device can be unlocked, for example, using fingerprint verification, device unlock passcode, biometric recognition (e.g., voice, face or eye print) or use of proximity devices such as smart watches or other wearable form factors as authenticators, as would be apparent to a person of ordinary skill in the art.

The data protection private key $120_{priv}$ is reconstructed during step 840 by combining the password-key part $120_{PW}$ with the local-key part $120_{LOCAL}$.

If, however, it was determined during step 810 that the device 110 is in an online mode, then the device 110 releases the local-key part $120_{LOCAL}$ during step 850 if the user unlocks the device 110, in the manner described above for step 830. During step 860, the device 110 obtains the remote-key part $120_{REMOTE}$ from the authentication and credential management server 150 if the device authenticates to the authentication and credential management server 150 with the transport private key $130_{priv}$ of the device 110. For example, the client can use the transport private key $130_{priv}$ to sign and send a request message to the authentication and credential management server 150, to thereby prove that the device 110 is a known device and is bound to a registered user account and that the user has authenticated to the device 110.

The data protection private key $120_{priv}$ is reconstructed during step 870 by combining the remote-key part $120_{REmOTE}$ with the local-key part $120_{LOCAL}$.

Recovery Mode

Figure 9:
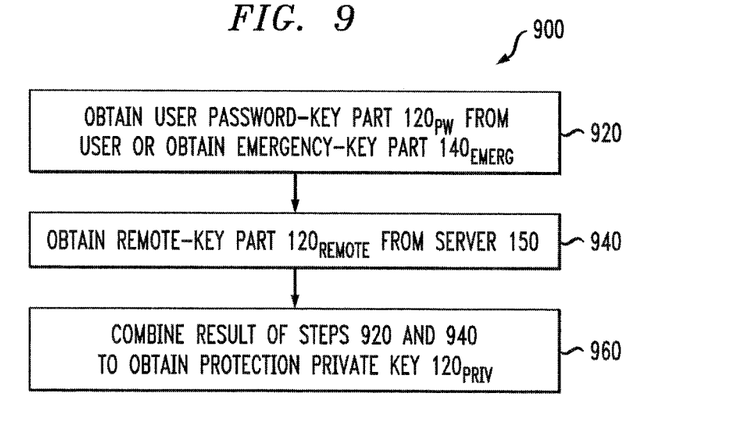
FIG. 9 illustrates an exemplary recovery private key reconstruction process for reconstructing the recovery private key.

FIG. 9 illustrates an exemplary recovery private key reconstruction process 900 for reconstructing the recovery private key $140_{pdv}$. The exemplary recovery private key reconstruction process 900 might be initiated, for example, when a user has lost all devices 110 and access to all cryptographic keys. The user then needs to restore content to a new device 110.

In one or more exemplary embodiments, the remote-key part $140_{REMOTE}$ and one of the password-key part $140_{PW}$ or the emergency-key part $140_{EMERG}$ can be combined to reconstruct the recovery private key $140_{priv}$.

As shown in FIG. 9, during step 920, the exemplary recovery private key reconstruction process 900 obtains the user password-key part $120_{PW}$ from the user or the emergency-key part $140_{EMERG}$ from the user. As noted above, the user can choose to print the emergency-key part $140_{EMERG}$ as a QR (Quick Response) code 350, store the emergency-key part $140_{EMERG}$ in a wearable device, hide the emergency-key part $140_{EMERG}$ in a picture, or send the emergency-key part $140_{EMERG}$ to social friends and family members.

The remote-key part $120_{REMOTE}$ is obtained from the authentication and credential management server 150 during step 940 using one or more of email confirmation verification, knowledge-based authentication (based, for example, on information from user profile and/or historical data) and biometric verification (e.g., voice recognition).

The data protection private key $120_{priv}$ is reconstructed during step 960 by combining the result of steps 920 and 940.

CONCLUSION

The foregoing applications and associated embodiments should be considered as illustrative only, and numerous other embodiments can be configured using the techniques disclosed herein, in a wide variety of different cryptography applications.

It should also be understood that the secret sharing, protection and synchronization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 10:
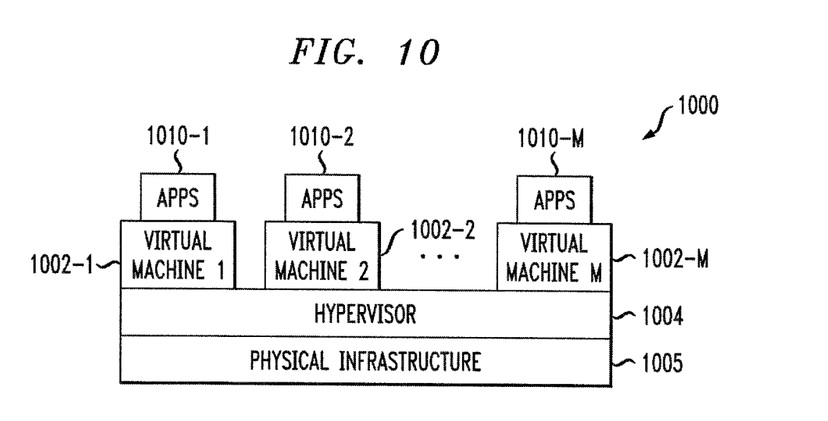
FIG. 10 illustrates an exemplary processing platform that may be used to implement at least a portion of one or more embodiments of the invention comprising a cloud infrastructure.

Referring now to FIG. 10, one possible processing platform that may be used to implement at least a portion of one or more embodiments of the invention comprises cloud infrastructure 1000. The cloud infrastructure 1000 in this exemplary processing platform comprises virtual machines (VMs) 1002-1, 1002-2, . . . 1002-M implemented using a hypervisor 1004. The hypervisor 1004 runs on physical infrastructure 1005. The cloud infrastructure 1000 further comprises sets of applications 1010-1, 1010-2, . . . 1010-M running on respective ones of the virtual machines 1002-1, 1002-2, . . . 1002-M under the control of the hypervisor 1004.

The cloud infrastructure 1000 may encompass the entire given system or only portions of that given system, such as one or more of client, servers, controller, authentication server or relying server in the system.

Although only a single hypervisor 1004 is shown in the embodiment of FIG. 10, the system may of course include multiple hypervisors each providing a set of virtual machines using at least one underlying physical machine.

An example of a commercially available hypervisor platform that may be used to implement hypervisor 1004 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

Figure 11:
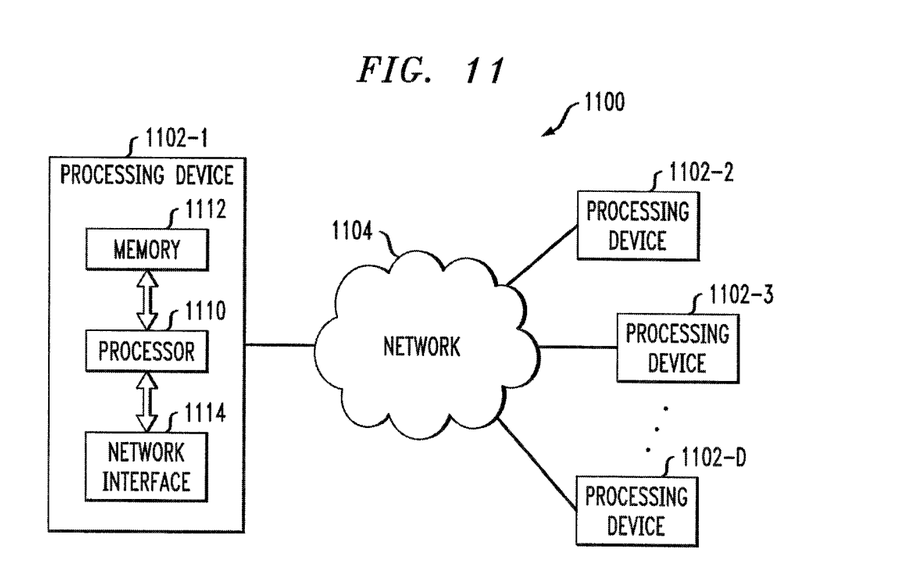
FIG. 11 illustrates another exemplary processing platform that may be used to implement at least a portion of one or more embodiments of the invention.

Another example of a processing platform is processing platform 1100 shown in FIG. 11. The processing platform 1100 in this embodiment comprises at least a portion of the given system and includes a plurality of processing devices, denoted 1102-1, 1102-2, 1102-3, . . . 1102-D, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "computer program product" having executable computer program code embodied therein, may comprise random access memory (RAM), read only memory (ROM) or other types of memory, in any combination.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 10 or 11, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from the secret sharing, protection and synchronization techniques as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a first device of a user, comprising:
    encrypting data, by at least one processing device of said first device, with a randomly-generated data encryption key to generate encrypted data;
    wrapping the randomly-generated data encryption key of said first device, by said at least one processing device of said first device, with a public key of a second device of the user to generate a wrapped data encryption key of the first device, wherein said encrypted data is distinct from said wrapped data encryption key of the first device; and
    sending, by said at least one processing device of said first device, (i) the encrypted data, and (ii) the wrapped data encryption key of the first device to a server, wherein the server sends (i) the encrypted data, and (ii) the wrapped data encryption key of the first device to the second device, wherein a given one of the first and second devices of the user is configured to access the encrypted data by (a) unwrapping the wrapped data encryption key of the first device using a private key of the given one of the first and second devices of the user, wherein said private key of the given device is reconstructed using a predefined number of shares obtained using a key splitting scheme; and (b) decrypting the encrypted data using the unwrapped data encryption key of the first device, wherein the first device and the second device are distinct from one another.

2. The method of claim 1, further comprising the steps of registering the first and second devices with said server and linking the first and second devices using a predefined value.

3. The method of claim 1, wherein the key splitting scheme splits one or more of the private key of the first device and a randomly-generated private key wrapping key into a plurality of shares comprising a user password key share, a device key share stored by the first device and a remote key share stored by the server.

4. The method of claim 3, wherein reconstruction of the private key requires the user password key share and the device key share when the first device is in an offline mode.

5. The method of claim 3, wherein reconstruction of the private key requires the device key share and the remote key share when the first device is in an online mode.

6. The method of claim 3, wherein the device key share is only released if the user authenticates to the first device using one or more predefined device unlock methods.

7. The method of claim 6, wherein the one or more predefined device unlock methods comprise biometric verification, entering a predefined device unlock passcode, and use of a predefined proximity device.

8. The method of claim 3, wherein the remote key share is only released if the first device authenticates to the server using a transport private key of the first device.

9. The method of claim 1, wherein the first device further comprises a recovery private key and wherein the key splitting scheme splits one or more of the recovery private key of the first device and a randomly-generated private key wrapping key into a plurality of shares comprising a user password key share, a remote key share stored by the server and an emergency key share.

10. The method of claim 9, wherein the user provides the emergency key share as one or more of a printed Quick Response code, stored in a wearable device, hidden in a picture, and as a message to at least one other person.

11. The method of claim 9, further comprising a recovery step to reconstruct the recovery private key by combining the remote key share with one of the user password key share and the emergency key share.

12. The method of claim 11, further comprising a recovery step to verify an integrity and validity of the emergency key share before requesting the remote key share from the server.

13. The method of claim 1, wherein said encrypting and wrapping steps comprise encrypting the data using a public key of the first device when the data is smaller than a predefined threshold.

14. A non-transitory machine-readable recordable storage medium, wherein one or more software programs when executed by one or more processing devices implement the following steps:
    encrypting, by at least one processing device of a first device of a user, data with a randomly-generated data encryption key to generate encrypted data;
    wrapping the randomly-generated data encryption key of said first device, by said at least one processing device of said first device, with a public key of a second device of the user to generate a wrapped data encryption key of the first device, wherein said encrypted data is distinct from said wrapped data encryption key of the first device; and
    sending, by said at least one processing device of said first device, (i) the encrypted data, and (ii) the wrapped data encryption key of the first device to a server, wherein the server sends (i) the encrypted data, and (ii) the wrapped data encryption key of the first device to the second device, wherein a given one of the first and second devices of the user is configured to access the encrypted data by (a) unwrapping the wrapped data encryption key of the first device using a private key of the given one of the first and second devices of the user, wherein said private key of the given device is reconstructed using a predefined number of shares obtained using a key splitting scheme; and (b) decrypting the encrypted data using the unwrapped data encryption key of the first device, wherein the first device and the second device are distinct from one another.

15. A first device of a user, comprising:
    a memory; and
    at least one processing device, coupled to the memory, operative to implement the following steps:
    encrypting data, by said at least one processing device of said first device, with a randomly-generated data encryption key to generate encrypted data;
    wrapping the randomly-generated data encryption key of said first device, by said at least one processing device of said first device, with a public key of a second device of the user to generate a wrapped data encryption key of the first device, wherein said encrypted data is distinct from said wrapped data encryption key of the first device; and
    sending, by said at least one processing device of said first device, (i) the encrypted data, and (ii) the wrapped data encryption key of the first device to a server, wherein the server sends (i) the encrypted data, and (ii) the wrapped data encryption key of the first device to the second device, wherein a given one of the first and second devices of the user is configured to access the encrypted data by (a) unwrapping the wrapped data encryption key of the first device using a private key of the given one of the first and second devices of the user, wherein said private key of the given device is reconstructed using a predefined number of shares obtained using a key splitting scheme; and (b) decrypting the encrypted data using the unwrapped data encryption key of the first device, wherein the first device and the second device are distinct from one another.

16. The first device of claim 15, wherein said at least one processing device is further configured to register the first and second devices with said server and link the first and second devices using a predefined value.

17. The first device of claim 15, wherein the key splitting scheme splits one or more of the private key of the first device and a randomly-generated private key wrapping key into a plurality of shares comprising a user password key share, a device key share stored by the first device and a remote key share stored by the server.

18. The first device of claim 17, wherein reconstruction of the private key requires the user password key share and the device key share when the first device is in an offline mode and the device key share and the remote key share when the first device is in an online mode.

19. The first device of claim 15, wherein the first device further comprises a recovery private key and wherein the key splitting scheme splits one or more of the recovery private key of the first device and a randomly-generated private key wrapping key into a plurality of shares comprising a user password key share, a remote key share stored by the server and an emergency key share and wherein a recovery step reconstructs the recovery private key by combining the remote key share with one of the user password key share and the emergency key share.

20. The first device of claim 15, wherein said at least one processing device is further configured to perform said encrypting and wrapping steps by encrypting the data using a public key of the first device when the data is smaller than a predefined threshold.

* * * * *

UNITED STATES PATENT AND TRADEMARK OFFICE
CERTIFICATE OF CORRECTION

| | |
|---|---|
| PATENT NO. | : 10,516,527 B1 |
| APPLICATION NO. | : 14/869150 |
| DATED | : December 24, 2019 |
| INVENTOR(S) | : Salah Machani, Boris Kronrod and Kevin D. Bowers |

It is certified that error appears in the above-identified patent and that said Letters Patent is hereby corrected as shown below:

On the Title Page

Item [71], replace "EMC IP HOlding Company LLC" with -- EMC IP Holding Company LLC --

Signed and Sealed this
Fourteenth Day of February, 2023

Katherine Kelly Vidal
*Director of the United States Patent and Trademark Office*